3,451,834
PROCESS FOR PREPARING IMPROVED TITANIUM DIOXIDE PIGMENT COMPOSITIONS

Harold A. Kerry, Whittier, and Melvin J. Mirliss, North Long Beach, Calif., assignors, by mesne assignments, to American Potash & Chemical Corporation, a corporation of Delaware
No Drawing. Filed Dec. 9, 1964, Ser. No. 417,233
Int. Cl. C09c 1/36, 1/62, 3/00
U.S. Cl. 106—300                    4 Claims

ABSTRACT OF THE DISCLOSURE

A process for treating titanium dioxide pigment particles whereby they may be readily wet by liquid vehicle components of surface coating compositions. The improved particles are prepared by contacting them, while in a dry state, with certain volatile aliphatic organic treating compounds and then drying the particles to remove substantially all of the volatile treating compound therefrom.

---

The present invention relates to improved titanium dioxide pigments. More particularly, it relates to processes for treating titanium dioxide pigment particles in such manner that surface coating compositions containing the same deposit films having substantially improved gloss characteristics.

Heretofore, various means have been suggested for improving the gloss characteristics of surface coating compositions such as acrylic lacquers. It long has been known that various factors have an effect on the degree of gloss exhibited by deposited films of acrylic lacquers. Perhaps the most important of these is the degree or extent to which the pigment particles themselves are wetted by the acrylic lacquer vehicle.

Titanium dioxide particles of carefully controlled size are used widely as pigments in various types of paint and lacquer formulations. It has been determined that those formulations which deposit surface coatings having the highest degree of gloss are those in which the titanium dioxide pigment particles are most evenly and uniformly wetted by the liquid vehicle. It has been a problem, however, to find a completely satisfactory means for effecting the desired maximum degree of particle wetting by the vehicle.

In the past, various organic wetting agents have been added to paint formulations in an effort to improve the wettability of the pigment and its subsequent dispersibility throughout the liquid vehicle. Moreover, resort has been had to various mechanical means such as grinding, shearing and milling devices designed to do mechanical work on the pigment and thereby aid in attempting to achieve desired wettability and consequent dispersibility of the pigment in the paint vehicle. Such techniques have met with varying degrees of success.

The surprising discovery now has been made that liquid compositions such as paints and lacquers which deposit surface coatings having a very high degree of gloss are provided by incorporating in such compositions titanium dioxide pigments which have been treated with small, yet critical, amounts of certain volatile organic liquids in which the particles are insoluble. Carbon tetrachloride and acetone have been found to be particularly satisfactory liquid treating agents. Other suitable liquids are those aliphatic organic materials in which titanium dioxide is insoluble. The aliphatic material may contain a halo, ether, ketone or alcohol functional group. Examples of such materials include chloroform, methyl iso-butyl ketone, mineral spirits, ethylene glycol mono-butyl ether and the like.

The reason why coating compositions formulated with pigments which have been treated with volatile organic liquids of the class described deposit surface coatings of high gloss is, at present, not fully understood. However, studies using refractive light coupled with the aid of electron microscope photographs have established that formulations which deposit coatings exhibiting the highest degree of gloss are those in which the individual titanium dioxide pigment particles are so completely wetted by the liquid vehicle that the number of groups or clusters of pigment particles in the vehicle is substantially reduced.

It has been observed that the treatment of titanium dioxide pigment particles with either carbon tetrachloride, acetone, or other volatile aliphatic organic liquid, in accordance with the present invention, provides a mass of particles which are readily wettable by a paint vehicle. Apparently, treatment with such liquids affects the surface characteristics of the individual particles in such manner that they repel one another or, at the least, are prevented from attracting and adhering to one another in the paint vehicle.

Titanium dioxide pigment particles prepared in accordance with this invention disperse readily in all liquid vehicles with a minimum amount of mechanical work. This is of particular advantage to paint formulators since they now need less shearing and milling equipment and can spend less time than formerly in preparing finished paint formulations exhibiting high gloss characteristics. The novel titanium dioxide particles of this invention are suitable for use in coating compositions wherein the liquid vehicle comprises, for example, alkyd resins, phenolic resins, acrylic lacquers, nitrocellulose lacquers and the like.

Experimental determinations have established that only relatively small quantities of either carbon tetrachloride, acetone or other volatile aliphatic organic liquid need be employed in treating the titanium dioxide pigment particles to render the same highly wettable by the liquid vehicle. Thus, amounts of organic liquid as small as about 0.05% and up to about 1% by weight, based on the total weight of the pigment, have been found to be satisfactory. Larger amounts may be used, if desired; however, no demonstrable improvement in pigment wettability has thus far been demonstrated.

The treatment with carbon tetrachloride, acetone or other of said organic liquids may be effected at various stages of the process of producing the titanium dioxide pigment particles. Preferably, the treatment is effected during what is conventionally referred to as the finishing step in titanium dioxide producing plants and at any time during the so-called "dry processing" portion of such finishing operation. It has been determined that particularly satisfactory results are obtained by spraying, atomizing, or otherwise applying the desired quantities of the said organic liquid to the particles. If desired, the particles even may be immersed in the liquid, drained and then dried.

To illustrate the invention even more fully the following specific examples are set forth; all parts and percentages given are by weight, unless otherwise indicated.

EXAMPLE

A quantity of titanium dioxide particles was divided into two portions. One portion was treated with carbon tetrachloride in accordance with one aspect of this invention. Specifically, that portion of particles was immersed in carbon tetrachloride, drained and then dried. No appreciable quantity of carbon tetrachloride was detectable on the dried particles. The other portion was not treated with carbon tetrachloride or acetone; it was used as a control for comparative purposes only. Both portions were formulated into lacquer compositions as follows.

A mixture containing 50 parts of pigment particles, 100 parts of toluol and 150 parts of a 30% acrylic resin solution (30% non-volatile content in toluol-butanol) was milled for 16 hours in a pebble mill. Thereafter, an additional 120 parts of acrylic resin solution was added and milling was continued for an additional 30 minutes. A test panel was prepared from each lacquer composition by drawing down a 3/1000" thick lacquer film on a glass panel. The film was allowed to dry in a dust-free atmosphere for 2 hours. Each panel then was read on a glossometer. The sample which did not contain carbon tetrachloride treated pigment had a gloss value of 75. The lacquer sample formulated from pigment which had been treated with carbon tetrachloride in accordance with this invention was much glossier and had a gloss value of 83.

To further demonstrate this invention additional surface coating formulations were prepared using five other quantities of titanium dioxide pigment particles, each quantity differing in various characteristics. Similarly as in the preceding example, each of the five quantities was divided into two portions each, one portion being left untreated to serve as a control and the other portion being treated with either carbon tetrachloride or acetone in amounts of about 0.5% by weight. As shown in the following table, formulations containing titanium dioxide pigment treated in accordance with the present invention have far superior gloss values than those containing titanium dioxide pigments which were not so treated.

TABLE

| Sample | Additive | Gloss value |
|---|---|---|
| 1 | None | 69 |
| 1a | $CCl_4$ | 76 |
| 2 | None | 67 |
| 2a | $CCl_4$ | 76 |
| 3 | None | 71 |
| 3a | $CCl_4$ | 82 |
| 4 | None | 58 |
| 4a | Acetone | 76 |
| 5 | None | 67 |
| 5a | Acetone | 75 |

In another series of comparative runs, quantities of titanium dioxide pigment particles were treated with the vapors evolved from several different volatile aliphatic organic liquids. The pigment particles, before exposure to the vapors, had a gloss value of 67. After treatment with the vapors evolved from chloroform, the particles had a gloss value of 70; after exposure to the vapors of methyl iso-butyl ketone, a value of 70; after exposure to the vapors of mineral spirits, a value of 71; after exposure to the vapors evolved from ethylene glycol mono-butyl ether, a value of 74; after exposure to the vapors evolved from carbon tetrachloride, a value of 71; and after exposure to the vapors evolved from the acetone, a value of 70. In each instance, the amount of the organic liquids used was within the range of from about 0.05% to about 1% by weight.

While the invention has been described with respect to what at present are considered to be the preferred embodiments thereof, it will be understood, of course, that certain changes, substitutions and modifications may be made therein without departing from its true scope.

What is claimed is:

1. A process for treating titanium dioxide pigment particles to improve their wettability by a liquid vehicle of a coating composition and increase the gloss of films deposited from such compositions which consists essentially of contacting dry titanium dioxide pigment particles with at least about 0.05% and up to about 1% by weight, based upon the weight of the dry particles, of a volatile aliphatic organic treating compound selected from the group consisting of carbon tetrachloride, acetone, chloroform, methyl iso-butyl ketone, mineral spirits, and ethylene glycol mono-butyl ether and thereafter drying the treated pigment particles to remove substantially all of the volatile treating compound therefrom.

2. A process as set forth in claim 1, in which the dry pigment particles are contacted with a vapor of the volatile treating compound.

3. A process as set forth in claim 1, in which the volatile treating compound is sprayed onto the dry pigment particles.

4. A process as set forth in claim 1, in which the volatile treating compound is atomized onto the dry pigment particles.

References Cited

UNITED STATES PATENTS

| 2,065,762 | 12/1936 | Stanley | 106—308 |
| 2,274,521 | 2/1942 | Berry | 106—308 |
| 2,282,303 | 5/1942 | Morrison et al. | 106—309 |
| 2,287,416 | 6/1942 | Dann | 106—309 |
| 2,291,082 | 7/1942 | Jarmus | 106—300 |
| 2,816,114 | 12/1957 | Ehrich et al. | 106—309 |
| 2,885,298 | 5/1959 | Eastman | 106—300 |
| 3,119,706 | 1/1964 | Bachmann | 106—308 |
| 3,343,974 | 9/1967 | Faulkner et al. | 106—300 |

FOREIGN PATENTS 824,509   12/1959   Great Britain.

OTHER REFERENCES

Ryan: "Flocculation: Dispersion and Settling of Pigments in Relation to Adsorption," Ind. and Eng. Chem., vol. 24, No. 11 (1932), pp. 1288–1398.

TOBIAS E. LEVOW, Primary Examiner.

S. E. MOTT, Assistant Examiner.

U.S. Cl. X.R.

106—308